US 9,571,589 B2

(12) United States Patent
Duleba et al.

(10) Patent No.: US 9,571,589 B2
(45) Date of Patent: *Feb. 14, 2017

(54) SYSTEMS AND METHODS FOR MAPPING IP-ADDRESSES TO GEOLOCATIONS

(71) Applicant: GOOGLE INC., Mountain View, CA (US)

(72) Inventors: Krzysztof Duleba, Pfaffikon (CH); Zhengrong Ji, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 14/698,081

(22) Filed: Apr. 28, 2015

(65) Prior Publication Data

US 2015/0244819 A1  Aug. 27, 2015

Related U.S. Application Data

(63) Continuation of application No. 13/428,148, filed on Mar. 23, 2012, now Pat. No. 9,026,145.

(51) Int. Cl.
*H04L 29/08* (2006.01)
*H04L 29/12* (2006.01)
*H04L 29/06* (2006.01)

(52) U.S. Cl.
CPC ............. *H04L 67/18* (2013.01); *H04L 61/25* (2013.01); *H04L 61/255* (2013.01); *H04L 61/609* (2013.01); *H04L 67/10* (2013.01); *H04L 67/42* (2013.01); *H04L 61/2007* (2013.01)

(58) Field of Classification Search
CPC .................................. H04L 67/18; H04W 4/02
See application file for complete search history.

(56) References Cited

U.S. PATENT DOCUMENTS

| | | | |
|---|---|---|---|
| 6,684,250 B2 | 1/2004 | Anderson et al. |
| 6,826,617 B1 | 11/2004 | Ansell et al. |
| 6,845,400 B2 | 1/2005 | MacPherson et al. |
| 6,947,978 B2 | 9/2005 | Huffman et al. |

(Continued)

OTHER PUBLICATIONS

"A Learning-based Approach for IP Geolocation," http://complex/elte.hu~haga/publications/comnet_geoloc.pdf , B. Eriksson et al., University of Wisconsin—Madison, Oct. 9, 2009, pp. 1-10.

(Continued)

*Primary Examiner* — Marisol Figueroa
(74) *Attorney, Agent, or Firm* — Marshall, Gerstein & Borun LLP (57) ABSTRACT

A computer-implemented method that includes receiving a location from a location aware access device and an IP address of a network device to which the location aware access device is connected, receiving a request that includes the IP address of the network device from a location unaware access device that is connected to the network device, determining a geographic location for the location unaware access device based on the IP address of the network device and the location received from the location aware access device, selecting information responsive to the request from the location unaware access device based at least in part on the geographic location, and providing the selected information to the location unaware access device.

20 Claims, 7 Drawing Sheets

(56) References Cited

U.S. PATENT DOCUMENTS

| | | | |
|---|---|---|---|
| 7,072,963 B2 | 7/2006 | Anderson et al. | |
| 7,100,204 B1 | 8/2006 | Myllymaki et al. | |
| 7,200,658 B2 | 4/2007 | Goeller et al. | |
| 7,809,857 B2 | 10/2010 | Anderson et al. | |
| 7,996,021 B2 * | 8/2011 | Brauel | H04W 64/00 455/404.2 |
| 8,483,685 B2 * | 7/2013 | Ghai | H04L 45/38 370/353 |
| 8,543,459 B2 | 9/2013 | Charaniya et al. | |
| 8,756,222 B1 | 6/2014 | Vyas et al. | |
| 9,026,145 B1 * | 5/2015 | Duleba | H04L 61/25 455/456.3 |
| 9,130,798 B1 * | 9/2015 | Mirza | H04L 61/2007 |
| 2002/0021675 A1 | 2/2002 | Feldmann | |
| 2002/0143991 A1 | 10/2002 | Chow et al. | |
| 2003/0074471 A1 | 4/2003 | Anderson et al. | |
| 2003/0110130 A1 | 6/2003 | Pelletier | |
| 2004/0068582 A1 | 4/2004 | Anderson et al. | |
| 2005/0055374 A1 | 3/2005 | Sato | |
| 2006/0121913 A1 | 6/2006 | Lin et al. | |
| 2007/0266257 A1 | 11/2007 | Camaisa et al. | |
| 2009/0112715 A1 | 4/2009 | Steelberg et al. | |
| 2009/0144411 A1 | 6/2009 | Winkler et al. | |
| 2009/0149199 A1 | 6/2009 | Maghoul | |
| 2010/0094682 A1 | 4/2010 | Symons et al. | |
| 2011/0302034 A1 | 12/2011 | Campbell et al. | |
| 2012/0102219 A1 | 4/2012 | Speckbacher et al. | |
| 2013/0039337 A1 * | 2/2013 | Hwang | H04W 36/0066 370/331 |

OTHER PUBLICATIONS

"A Model Based Approach for Improving Router Geolocation," http://cs-people.bu.edu/eriksson/papers/erikssonPAM10.pdf S. Laki et al., Computer Networks 54 (2010) pp. 1490-1501.

Office Action issued in U.S. Appl. No. 13/428,148 dated Jul. 7, 2014.

U.S. Appl. No. 13/149,622, entitled "Mapping IP Addresses to Locations," by Krzyzstof Duleba et al., filed May 31, 2011.

* cited by examiner

```
        RECEIVE IP ADDRESS DATA AND
      CORRESPONDING GEOLOCATION DATA
          FOR NETWORK DEVICES
                  302
                   │
                   ▼
      STORE IP ADDRESS DATA AND
  CORRESPONDING GEO LOCATION DATA IN
          TEMPORARY LOG
                304
```

*FIG. 3*

| IP Address | Geolocation | Timestamp |
|---|---|---|
| IP_address_1 | L1 | 18:06.21 |
| IP_address_2 | L2 | 18:06.23 |
| IP_address_1 | L1 | 18:06.23 |
| IP_address_3 | L3 | 18:06.24 |
| IP_address_2 | L4 | 18:06.27 |
| IP_address_4 | L5 | 18:06.34 |
| IP_address_1 | L1 | 18:06.35 |
| IP_address_2 | L6 | 18:06.44 |
| IP_address_1 | L2 | 18:06.44 |
| ⋮ | ⋮ | ⋮ |
| IP_address_1 | L1 | 18:13.59 |

SYSTEMS AND METHODS FOR MAPPING IP-ADDRESSES TO GEOLOCATIONS

CROSS-REFERENCE TO RELATED APPLICATIONS

This application is a continuation of and claims priority to U.S. application Ser. No. 13/428,148, filed on Mar. 23, 2012, entitled "Systems and Methods for Mapping IP-Addresses to Geolocations," the entire disclosure of which is hereby expressly incorporated by reference herein.

BACKGROUND OF THE INVENTION

1. Field of the Invention

This invention generally relates to associating Internet Protocol (IP) addresses to geographic locations and more particularly to mapping IP-addresses based on precise geographic location data.

2. Description of the Related Art

Geolocation refers to the identification of a real-world geographic location of an object, such as a cellular phone, computer, or the like. Some businesses employ geolocation techniques to learn more about customers in order to provide goods, services, content, advertisements or so forth that may be of particular interest to the customers. For example, a website may employ geolocation techniques to identify the location of a person requesting to view a webpage in order to deliver webpage content that may be of particular interest to persons at that location, such as local news, local maps, local advertisements and so forth.

In the context of the Internet, geolocation involve associating the addresses of devices used to access the Internet with their locations. For example, an Internet Protocol (IP) address assigned to a computer may be associated with the geographic location of the computer. Requests that are associated with the IP-address may then be served with content that is selected based on the geographic location associated with that IP-address. In some instances, the locations of devices having given IP-addresses are determined based on an analysis of contextual information provided in user based search queries received from those devices. For example, a search query from a device with a given IP-address for "pizza Los Angeles" may be used to infer the device with that IP-address is located in Los Angeles. This technique, when employed on a large volume of data from any number of users and IP-addresses, allows the creation of a large table associating IP-addresses with locations. While the foregoing technique is useful, it is based on historical information and therefore may be inaccurate in the short term, for example, when an Internet Service Provider (ISP) dynamically re-assigns one or more of the IP-addresses in the table to devices that are in a different location. As a result, data previously collected for the given IP address may be outdated, and the determined location of a device assigned that IP-address may be inaccurate.

SUMMARY OF THE INVENTION

Various embodiments of methods and apparatus for mapping IP-addresses to geographic locations (e.g., geolocations) based on precise geolocation data are provided herein. In some embodiments, provided is a computer-implemented method that includes receiving a location from a location aware access device and an IP address of a network device to which the location aware access device is connected, receiving a request that includes the IP address of the network device from a location unaware access device that is connected to the network device, determining a geographic location for the location unaware access device based on the IP address of the network device and the location received from the location aware access device, selecting information responsive to the request from the location unaware access device based at least in part on the geographic location, and providing the selected information to the location unaware access device.

In some embodiments, provided is a computer-implemented method that includes receiving a request from a location unaware access device that is connected to a network device, wherein the request includes an IP address of the network device, determining a geographic location for the location unaware access device based on the IP address of the network device and an analysis of one or more records stored in a data repository each of which associate a location received from a location aware access device previously connected to the network device and the IP address of the network device, selecting information responsive to the request from the location unaware access device based at least in part on the geographic location, and providing the selected information to the location unaware access device.

In some embodiments, provided is a computer system that includes one or more memories storing instructions and one or more processors coupled to the one or more memories and executing the instructions stored thereon in order to perform the following: receiving a location from a location aware access device and an IP address of a network device to which the location aware access device is connected, receiving a request that includes the IP address of the network device from a location unaware access device that is connected to the network device, determining a geographic location for the location unaware access device based on the IP address of the network device and the location received from the location aware access device, selecting information responsive to the request from the location unaware access device based at least in part on the geographic location, and providing the selected information to the location unaware access device.

In some embodiments, provided is a computer system that includes one or more memories storing instructions and one or more processors coupled to the one or more memories and executing the instructions stored thereon in order to perform the following: receiving a request from a location unaware access device that is connected to a network device, wherein the request includes an IP address of the network device, determining a geographic location for the location unaware access device based on the IP address of the network device and an analysis of one or more records stored in a data repository each of which associate a location received from a location aware access device previously connected to the network device and the IP address of the network device, selecting information responsive to the request from the location unaware access device based at least in part on the geographic location, and providing the selected information to the location unaware access device.

DETAILED DESCRIPTION OF THE PREFERRED EMBODIMENTS

As discussed in more detail below, provided in some embodiments are systems and methods for mapping IP-addresses based on precise geographic location data. The precise geolocation data can be provided in the form of geographic coordinates (e.g., latitude and longitude coordinates) via mobile devices such as cellular phones employing embedded Global Positioning System (GPS) devices and/or using other positioning techniques (e.g., cellphone tower triangulation or wifi access point triangulation).

The precise geolocation data may be transmitted from a device in association with an Internet Protocol IP-address or similar identifier associated with the device. In some embodiments, a geolocation system may receive IP-addresses and associated precise geolocation data from a number of devices to generate a "real-time" log of IP-addresses and associated geolocation data. In certain embodiments, the log may be monitored to identify log entries that provide accurate (e.g., valid) IP-address/geolocation data. This may include filtering-out IP-address/geolocation data in which an IP-address is associated with multiple locations that are scattered across a large geographic region. This can occur, for example, when multiple devices at different geographic locations connect to a network through a proxy network device. In certain embodiments, valid log-entries may be identified/extracted from a raw data log or data feed after such a filtering step.

In certain embodiments, very high precision geolocation data in valid log-entries may be replaced with less precise geolocation data (e.g., zip codes rather than latitude/longitude) to protect user privacy. In some embodiments, the IP-address/geolocation data is used to populate an IP-address/geolocation mapping table. The table may include, for each given IP-address, a corresponding set of recently received geolocation data and/or a geolocation (e.g., a postal/zip-code) that is derived from that data. In response to receiving a request from a device associated with a given IP-address, the table may be used to locate the device. In certain embodiments, the geolocation (e.g., zip-code) obtained from the table may be compared with one or more other geolocations mapped to the device's IP-address based on one or more other geolocation mapping techniques, such as the historical search query technique described above. In some embodiments one or more of the mapped geolocations may be selected based on confidence levels respectively associated with the one or more mapped geolocations, and/or based on internal consistency among the one or more mapped geolocations. In some embodiments, the selected geolocation(s) may be provided as the location of the device associated with the given IP-address. In certain embodiments, the selected geolocation may be used to select targeted content to be provided to the requesting device for presentation to a user. For example, a webpage including advertisements for products in a selected geolocation may be served to the computer associated with the given IP-address.

In some embodiments, the techniques described herein may enable a first device associated with a given IP-address to be located based on highly-precise geolocation data received from a second device associated with the same IP-address. For example, when a user accesses the internet via a GPS enabled cellular phone connected through a wireless router/modem having a given IP-address, a desktop computer connected to the Internet through the same router/modem may be precisely geolocated based on the geolocation data received from the cellular phone.

In some embodiments, the techniques described herein may provide for near real-time updating of geolocations associated with one or more IP-addresses. This can be useful, for example, to update the location of devices having dynamically assigned IP-addresses. For example, many Internet Service Providers (ISPs) dynamically assign IP-addresses to network devices (e.g., routers and/or modems) such that the network devices are assigned different IP-addresses every time they connect to the network. The techniques described herein allow for continually collecting, monitoring and assessing highly-precise geolocation data received from or through such network devices (e.g., from a GPS enabled cellular phone wirelessly connected through a router having a dynamically assigned IP-address) in order to precisely geolocate such network devices. In general, it may be expected that highly-precise geolocation data may be inserted into a table used to map IP-address to precise geolocations within fractions of a second of the precise geolocation data being made available to the geolocation system. In some embodiments, saved IP-address/geolocation data may be allowed to expire to ensure that the IP-address/geolocation mapping is fresh, and accurately reflects the most recent geolocation of devices currently associated with the given IP-address.

Although several of embodiments described herein regard mapping of IP-addresses to geolocations, the techniques described herein may generally be employed for mapping other forms of network addresses, such as Media Access Control addresses (MAC addresses) or the like, to geolocations. Moreover, the techniques described herein may be employed with regard to various addressing techniques, including both of IPv4 and IPv6 IP-addressing techniques.

Figure 1:
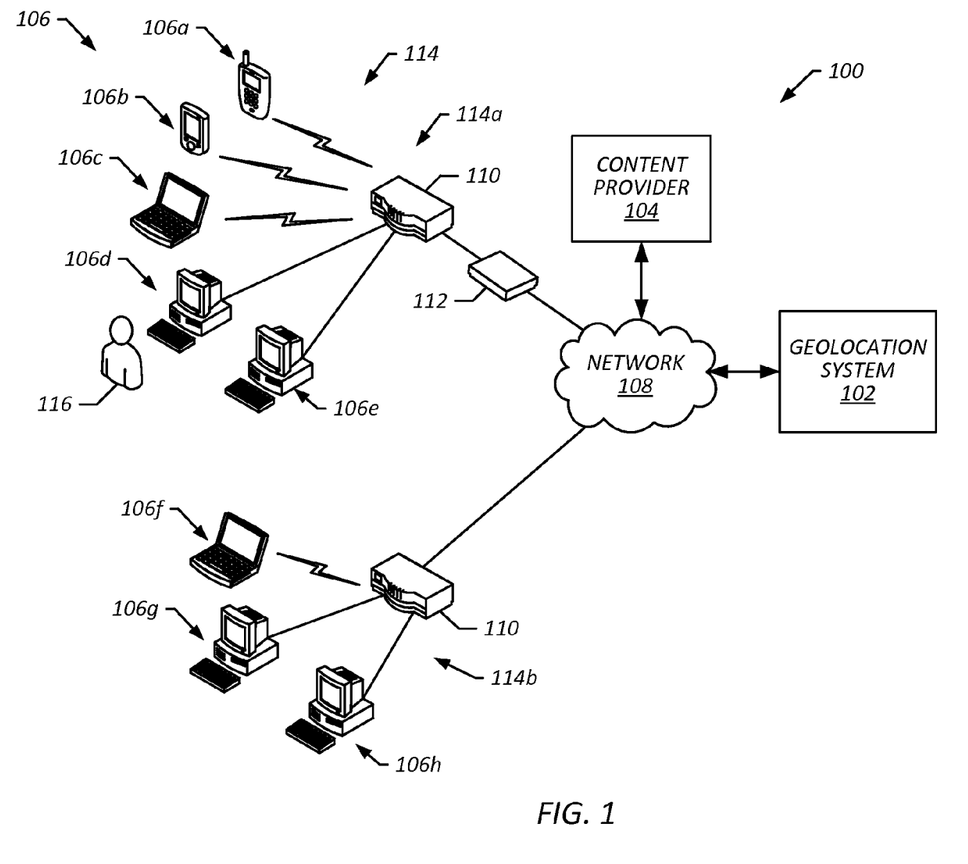
FIG. 1 is a diagram that illustrates an exemplary network communication system in accordance with one or more embodiments of the present technique.

FIG. 1 is a diagram that illustrates an exemplary network communication system (e.g., system) 100. As depicted, network system 100 may include a geolocation system 102, a content provider 104, and/or access devices 106. Entities of system 100 may be communicatively coupled to one another via a network 108, and one or more sub-networks, such as access networks 114. In some embodiments, access devices 106 may be coupled to network 108 via network access points, such as routing devices 110 and/or modems 112, existing on both network 108 and sub-networks 114.

Network 108 may include any element or system that facilitates communications between various network entities/nodes of system 100. For example, network 108 may facilitate communication between IP geolocation system 102, content provider 104, and/or access devices 106 via sub-networks 114. Network 108 may include an electronic communication network, such as the Internet, a local area network (LAN), a wide area (WAN), a cellular communications network or the like. Network 108 may facilitate data exchange by way of packet switching using the Internet Protocol (IP). Network 108 may facilitate wired and/or wireless connectivity and communication. Network 108 may include a single network or combination of networks that facilitate communication between the entities of system 100.

In some embodiments, network 108 may include or otherwise be coupled to one or more routing devices 110. Routing devices 110 may include devices that forward data packets between portions of network 108 and/or between network 108 and other networks 114. Routing devices 110 may receive packets of data, read address information associated with the packets to determine their destination, and direct the packets toward their destination. Routing devices 110 may employ a routing protocol to provide for the routing of data and information between other routing devices and/or network nodes. A network may include any number of routing devices 110 employed to route data packets from a source node to one or more destination nodes.

In some embodiments, network 108 may include one or more modem devices 112. Modem devices 112 may provide a connection or access to network 108 via an Internet Service Provider (ISP). Modems 112 may include a device or program that converts data for transmission to an ISP via a given medium, such as telephone/cable lines, wirelessly transmitted signals or the like. The ISP may provide a network interface for forwarding the transmissions through network 108. Modems 112 may include a wired or wireless modem providing a wired or wireless connection to network 108. Routing devices 110 may pass data, such as web pages and e-mail between an access device 106 and a modem 112 for transmission to other entities of network 108 via an ISP.

In some embodiments, one or more access devices 106 may be coupled to a given routing device 110. For example, in the illustrated embodiment, a first access network 114a includes access devices 106a-106e connected to routing device 110a and a second access network 114b includes access devices 106f-106h connected to routing device 110b. In some embodiments, a routing device 110 may include a wireless and/or wired router. For example, access devices 106a, 106b and 106c may be connected to routing device 110a of first access network 114a wirelessly, while access devices 106d and 106e may be connected to routing device 110a of first access network 114a via a wired connection. Access device 106f may be connected to routing device 110b of second access network 114b wirelessly, while access devices 106g and 106h may be connected to routing device 110b of second access network 114b via a wired connection.

Every device connected to a network has a unique address assigned to it, for example, a unique IP address. Devices that are connected to multiple networks, often called gateways, can have multiple network addresses assigned to them, one address for each network to which the device is connected. For example, devices 106a-106e and router 110 can each be assigned an IP address that is unique on sub-network 114a. Router 110 can also be assigned a second IP address that is unique on network 108. When any of the devices 106a-106e communicate with a device on network 108, they do so through router 110. Since the IP addresses assigned to devices 106a-106e may not be unique on network 108, router 110 uses a network address translation (NAT) protocol to replace the IP addresses associated with data packets sent from devices 106a-106e with its own network 108 IP address. As a result, from the perspective of geolocation system 102 and other devices on network 108, devices 106a-106e on sub-network 114a appear to have/share the same IP address on network 108—i.e., the unique IP address of router 110 on network 108.

Access devices 106 are generally devices that are capable of transmitting and/or receiving information via network 108, and may include one or more of a personal computer (e.g., a desktop computer), a mobile computing device (e.g., a laptop computer), a cellular communication device (e.g., a cellular phone), a personal digital assistant (PDA), a mapping device (e.g., GPS navigation system), a media player/recorder, a game console, a television system, an audio system, a radio system, or the like. Access devices 106 may include a wired or a wireless connection to network 108.

Access devices 106 may include general computing components and/or embedded systems optimized with specific components for performing specific tasks. A given access device 106 may include various modules (e.g., functions, programs, and/or applications) including program instructions that are executable to perform some or all of the functionality described with regard to the given access device 106. Access devices 106 may include one or more applications (e.g., an Internet web-browser application) that can be employed to generate requests for content, to receive content, to render content for presentation/display to a user, to enable a user to view or otherwise interact with content, to receive requests for data, to process received requests, to provide data, and so forth. Access device 106 may employ an Internet web-browser or similar application that enables users to access, retrieve and/or view documents and other resources on the Internet.

Access devices 106 may include various input/output (I/O) interfaces. Access devices 106 may include a graphical user interface (e.g., a display screen), an audible user interface (e.g., a speaker and microphone), a printer, a keyboard, a pointer device (e.g., mouse, trackball, touchpad, stylus), or the like. In some embodiments, access devices 106 may include one or more computer systems similar to that of computer system 1000 described below with regard to at least FIG. 10.

Content provider 104 may include an entity (e.g., a website provider) that provides various forms of data/information to other entities of system 100 via network 108. Content provider 104 may include one or more content servers hosting one or more content sites (e.g., websites, file transfer protocol (FTP) sites, or the like) accessible via network 108. A content server of content provider 104 may store or otherwise have access to content, such as content pages (e.g., webpages) that may be provided for presentation to user 116. A content page may include text, images, video, or other digital content that may be rendered for presentation to user 116. Content provider 104 may serve content in response to receiving one or more corresponding content requests. For example, a content provider 104 may serve a given page to an access device 106 in response to receiving a corresponding content request for the given page from the access device 106. In some embodiments, content provider 104 may serve targeted content based on a geolocation of access device 106. For example, a content provider 104 may serve a page with a first set of ads associated with a first geolocation where it is determined that access device 106 is located in the first geolocation, and serve a page with a second set of ads associated with a second geolocation where it is determined that the access device 106 is located in the second geolocation.

Geolocation system 102 may include an entity that provides for geolocation of an object, such as geolocation of one or more of access devices 106, routers 110 and/or modems 112. In some embodiments, geolocation system 102 may provide geolocation of network devices based on the IP addresses associated with the network devices. For example, geolocation system 102 may collect IP-addresses and geolocation data corresponding to the IP-addresses to generate a mapping of IP-addresses to real-world physical/geolocations (e.g., geographic coordinates, a physical address, zip-code, city, state, country, continent, time zone or the like). Upon receiving a request for geolocation data for a device having a given IP-address, geolocation system 102 may provide a geolocation for the device based on the mapping.

In some embodiments, IP-addresses and geolocation data are collected from requests received from access devices. For example, when a user submits a request for content via an access device, the request may include an IP-address of the access device and highly-precise geolocation data (e.g., geographic coordinates) indicative of the precise geolocation of the access device at or near the time of the request. For example access device 106a may be a cellular phone having an integrated GPS device that is wirelessly connected to network 108 through router 110. When the user of access device 106a submits a search request (e.g., the string "Los Angeles Hotels") from access device 106a, the request will include the IP address of router 110 as explained above. Moreover, the geographic coordinates of the cellular phone at or near the time of the search request can be determined from an embedded GPS device. A corresponding search request tuple indicating the search string (e.g., "Los Angeles Hotels"), the IP-address of router 110 to which the cellular phone is connected (e.g., an IP-address of "132.16.254.1"), the geographic coordinates determined from the GPS device on the cellular phone 106a (e.g., "32.718555, −117.163696") and/or a timestamp (e.g., "18:06.21") may be generated and transmitted to content provider 104 and/or geolocation system 102. As described herein, the IP-address, the highly-precise geolocation data and/or the timestamp may be used to generate a mapping of IP-addresses to geographic locations and/or regions such as a postal/zip-code or the like.

In some embodiments, a mapping of IP-addresses to geolocations may be used to provide relevant geolocation data for responding to a user request associated with a given IP-address. For example, when content provider 104 receives a user request for a webpage from an access device 106e that is also connected to router 110 and associated with the IP-address assigned to router 110 on network 108, content provider 104 may submit to geolocation system 102 a corresponding request for geolocation information corresponding to the IP-address. Geolocation system 102 may in turn determine a geolocation that corresponds to the given IP-address and serve that geolocation to content provider 104. Content provider 104 may then serve content to access device 106e that is targeted to users in the determined geolocation (e.g., a webpage including advertisements directed to persons located in that geolocation). Accordingly, where the mapping of the given IP-address is determined based at least in part on the geolocation data provided by an access device 106a, as described above, other access devices 106 on the first access network 114a that access network 108 through a common gateway or router 110, may be similarly geolocated based on the geolocation data provided by access device 106a.

Figure 2:
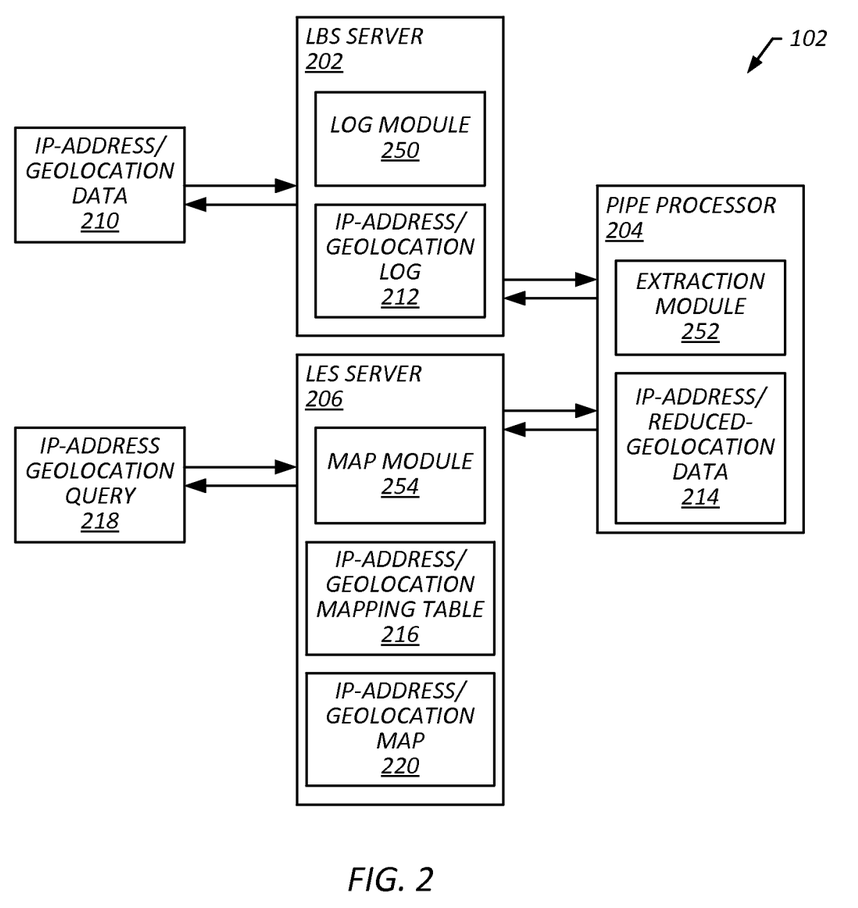
FIG. 2 is a diagram that illustrates a geolocation system in accordance with one or more embodiments of the present technique.

FIG. 2 is a diagram that illustrates geolocation system 102 in accordance with one or more embodiments of the present technique. Geolocation system 102 may include a Location Based Services (LBS) server 202, a pipe processor 204, and/or a Location Extraction Server (LES) 206.

LBS server 202 may receive IP-address and/or geolocation data 210. For example, LBS server 202 may receive an IP address, latitude, longitude, timestamp request string (e.g., "132.16.254.1; 32.718555, −117.163696; 18:06.21") from device 106a and/or content provider 104. In some embodiments, LBS server 202 may receive similar requests associated with any number of devices on network 108. LBS server 202 may log the received IP-address and/or geolocation data 210 in an IP-address/geolocation log 212. For example, LBS server may parse the request string "132.16.254.1; 32.718555, −117.163696; 18:06.21" to generate a corresponding log entry including an IP-address of "132.16.254.1", precise geolocation data including the geographic coordinates of "32.718555, −117.163696" and/or a timestamp of "18:06.21". In some embodiments, LBS server may parse similar requests from any number of devices of network 108 to generate a plurality of log entries, each including an IP-address, precise geolocation data, and/or timestamp. IP-address/geolocation log 212 may be expunged on a regular basis (e.g., every hour, every day, every week, or the like). Alternatively, individual entries in IP-address/geolocation log 212 may be expunged after a similar expiration period. A more detailed discussion of the operation/functionality of LBS server 202 is provided below with regard to at least method 300 of FIG. 3.

Pipe processor 204 may monitor IP-address/location log 212 to identify and extract only those log entries that include accurate (e.g., valid) IP-address/geolocation data. For example, pipe processor 204 may filter-out or otherwise ignore log entries for a given IP-address that are associated with multiple geolocations that are scattered across a vast geographic region. This can occur, for example, when a number of devices access network 108 through the same proxy server. The IP addresses associated with those devices will be that of the proxy server, even though the devices may be accessing the server from many different locations.

In some embodiments, pipe processor 204 may process the identified/extracted IP-address/geolocation data to reduce the granularity of the geolocation data, thereby generating IP-address/reduced-geolocation data 214. IP-address/reduced-geolocation data 214 may include geolocation data at a lower level of granularity than the highly precise geolocation data provided in the entries of IP-address/location log 212. For example, where the valid entries of log 212 include actual geographic coordinates, pipe processor 204 may replace the geographic coordinates with a corresponding zip-code, city name, county name or other less specific geographic location. Pipe processor 204 may forward IP-address/reduced-geolocation data 214 to LES server 206 for processing.

A more detailed discussion of the operation/functionality of pipe processor 204 is provided below with regard to at least method 500 of FIG. 5.

LES server 206 may process the IP-address/reduced-geolocation data 214 to generate an IP-address/geolocation mapping table 216. IP-address/geolocation mapping table 216 may associate IP-addresses with a set of recently obtained geolocation data. For example, as IP-address/reduced-geolocation data 214 is received, a dataset that includes the geolocation data (e.g., a zip-code) and optionally a timestamp associated with a given IP address may be extracted and associated with an entry of mapping table 216 that is keyed to that IP-address. In some embodiments, the recent geolocation data may be limited to a given number of the most recently obtained geolocation datasets that have not yet expired. For example, the recent geolocation data for a given IP-address may be limited no more than one-thousand geolocation datasets received within the preceding twenty-four hours. In some embodiments, LES server 206 may process the recently received geolocation datasets for a given IP-address to identify a particular geolocation to be mapped to the given IP-address, and may store that geolocation in the mapping table 216.

In some embodiments, LES server 206 may employ the mapping of IP-addresses to geolocations to provide relevant geolocation data for responding to requests associated with a given IP-address. For example, where content provider 104 receives a request for a webpage from an access device 106e and the request is associated with a given IP-address (e.g., the IP address of router 110), content provider 104 may submit to LES server 206, a query 218 requesting geolocation information corresponding to the given IP-address. LES server 206 may access IP-address/geolocation mapping table 216 to look-up or otherwise identify the most recent geolocation data (e.g., the precise geolocation or geolocation datasets) associated with the given IP-address, and thereby determine the most up-to-date geolocation (e.g., zip-code "92113") associated with the given IP-address. LES server 206 may then serve to content provider 104 the determined geolocation (e.g., zip-code "92113"). Content provider 104 may serve to access device 106e, content that is targeted to users in the determined geolocation, such as news, maps, advertisements or the like directed to persons located in that location.

In some embodiments, LES server 206 may include or otherwise have access to other IP-address/geolocation mappings. These IP-address geolocation mappings may be received from a third party provider, or may be generated by analyzing historical search query logs, to identify locations associated with search queries received from particular IP addresses. While such mappings may be more comprehensive than IP-address of geolocation table 216, they will generally by much less up-to-date than table 216. In some embodiments, a location obtained from IP-address geolocation mapping table 216 (e.g., based on recently received IP-address/geolocation data 210) may be compared to a second location obtained from IP-address/geolocation map 220. LES server 206 can use the two locations to determine which of the geolocations to ultimately map to the given IP-address and/or to determine a confidence level associated with one or more of the determined locations.

A more detailed discussion of the operation/functionality of LBS server 206 is provided below with regard to at least method 700 of FIG. 7 and method 900 of FIG. 9.

LBS server 202, pipe processor 204 and LES server 206 may include a log module 250, an extraction module 252 and a map module 254, respectively. Modules 250, 252 and/or 254 may include program instructions that are executable by a computer system to perform some or all of the functionality described herein with regard to at least LBS server 202, pipe processor 204 and/or LES server 206, respectively. In some embodiments, LBS server 202, pipe processor 204 and/or LES server 206 may employ one or more computer systems similar to that of computer system 1000 described in more detail below with regard to at least FIG. 10. Although LBS server 202, pipe processor 204 and LES server 206 are each represented by a single box in FIG. 2, each of LBS server 202, pipe processor 204 and LES server 206 may include a single server or similar system, or a plurality of servers and/or similar systems. For example, LBS server 202, pipe processor 204 and/or LES server 206 may include a plurality of different servers and/or similar systems that may be employed individually or in combination to perform some or all of the functionality described herein with regard to LBS server 202, pipe processor 204 and/or LES server 206. In some embodiments, each of LBS server 202, pipe processor 204 and LES server 206 may include or otherwise have access to one or more datastores including one or more databases or other memory locations for storing data (e.g., IP-address/location log 212, IP-address/reduced-geolocation data 214 and/or IP-address/geolocation map 216) and/or modules 250, 252 and/or 254.

Figure 3:
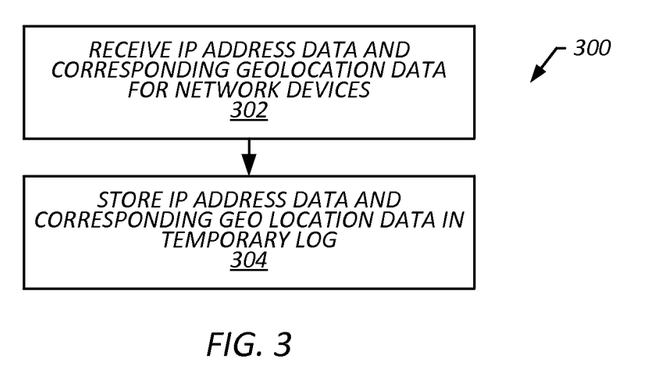
FIG. 3 is a flowchart that illustrates a method for acquiring IP-address and corresponding geolocation information in accordance with one or more embodiments of the present technique.

FIG. 3 is a flowchart that illustrates an exemplary method 300 for acquiring IP-addresses and corresponding geolocation information. Method 300 may include receiving IP-address data and corresponding geolocation data for network devices, as depicted at block 302. For example, receiving IP-address data and corresponding geolocation data for network devices may include LBS server 202 receiving IP-address/geolocation data 210 associated with access devices 106, routing devices 110, modem devices 112 and so forth. In some embodiments, IP-address/geolocation data 210 is based at least in part on a request for content. For example, where access device 106a generates a content request for a webpage to be displayed to user 116, the content request may include IP-address/location data 210 indicative of an IP-address associated with device 106a, a precise geolocation of device 106a at or near the time of the request, and a timestamp indicating when device 106a was determined to be located at the precise geolocation.

Method 300 includes storing IP-address data and corresponding geolocation data for network devices in a temporary log, as depicted at block 304. For example, as discussed above, IP-address/geolocation data 210 received by LBS server 202 can be stored in an IP-address/geolocation log 212 at block 302.

Figure 4:
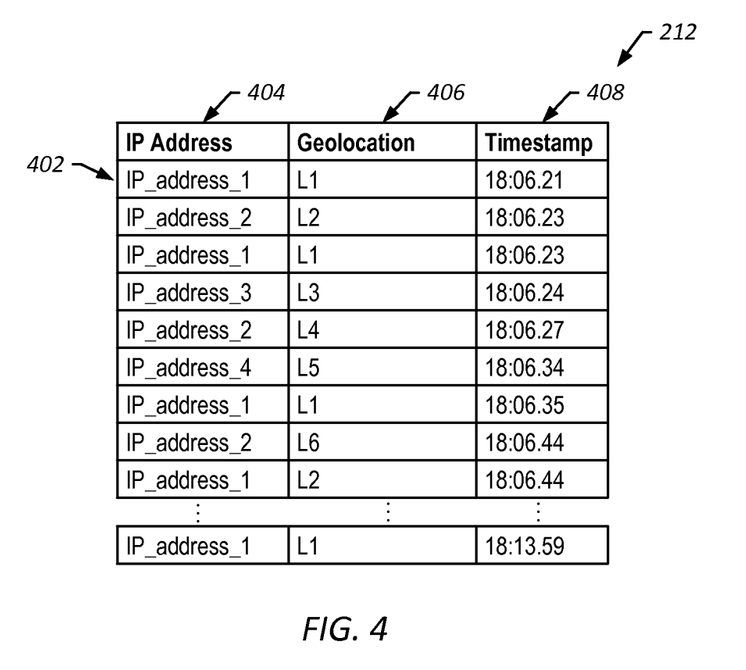
FIG. 4 is a diagram that illustrates an exemplary representation of an IP-address/geolocation log in accordance with one or more embodiments of the present technique.

FIG. 4 is a diagram that illustrates an exemplary representation of IP-address/geolocation log 212. Log 212 may include a plurality of entries 402 that each correspond to a particular set of received IP-address/geolocation data 210. A given set of IP-address/geolocation data 210 may include an IP-address 404 associated with the device (e.g., device 106a), a precise geolocation 406 of the device at or near the time of a request, and/or a timestamp 408 indicating a time at which the device was determined to be located at the precise geolocation.

In some embodiments, LBS server 202 may receive and process sets of IP-address/geolocation data 210 in real-time to generate any number of entries 402. For example, as requests are generated from network devices, corresponding sets of IP-address/geolocation data 210 may be received and processed by LBS server 202 to generate corresponding log entries 402. In one embodiment, log 212 may contain up to ten sets of IP-address/geolocation data 210 received at LBS server 202. Other embodiments are of course possible, and log 212 may include any number of sets of IP-address/geolocation data.

In some embodiments, entries 402 of log 212 may expire and/or be expunged from log 212 after a given period of time. For example, log entries 402 may expire in four hours based on their timestamp. In some embodiments, log 212 may be maintained as a rolling collection of a given number of most recent entries. For example, log 212 may be maintained as a rolling log of the preceding one thousand entries 402, such that the oldest entry 402 of log 212 is expunged upon the addition of a new entry 402. In some embodiments, the given number of entries may correspond to a number of entries expected to be generated over a given period. For example, it may be expected that one-thousand requests are received every four hours and, thus, a given entry 402 may be expected to be expunged from log 212 within about four hours of being added to log 212 during periods of normal traffic. In some embodiments, log 212 may provide a combination of a rolling collection of a given number of entries and/or expiration of entries. For example, entries 402 may be expunged either due to the addition of newer entries or their expiration, whichever occurs first. Such temporary retention of log data increases user privacy by ensuring that highly-precise geolocations associated with user IP-addresses are processed and disposed of quickly. Moreover, it ensures the provision of the most up-to-date geolocation data for a given IP address.

As discussed herein, pipe processor 204 may monitor log 212 to identify and/or extract entries 402 including IP-address/geolocation data 210 that may be used for generating IP-address/geolocation mapping table 216.

Figure 5:
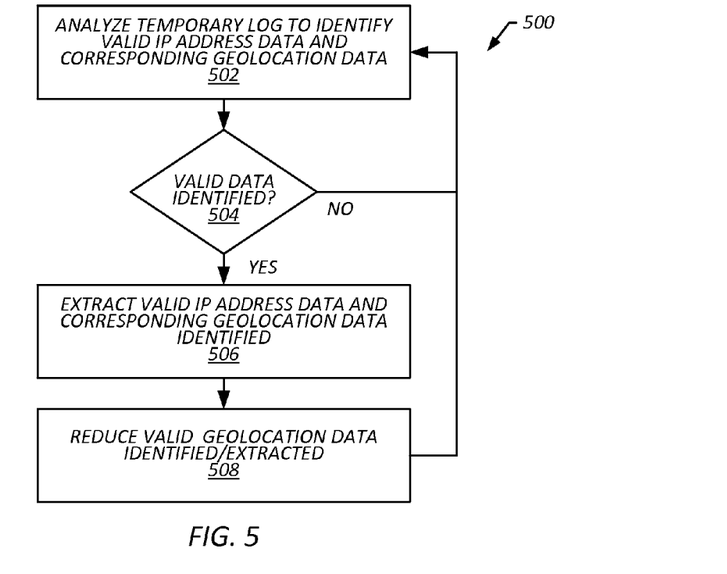
FIG. 5 is a flowchart that illustrates a method for generating IP-address and/or reduced geolocation data in accordance with one or more embodiments of the present technique.

FIG. 5 is a flowchart that illustrates an exemplary method 500 for generating IP-address and/or reduced-geolocation data. Method 500 may include analyzing log 212 to identify valid IP-address data and corresponding geolocation data, as depicted at block 502. In some embodiments, analyzing log 212 to identify valid IP-address and corresponding geolocation data may include identifying entries 402 in log 212 that have consistent IP-address and geolocation data. For example, where a given IP-address (e.g., "IP_address_1") occurs in multiple entries 402, and each of those entries 402 includes the same or similar geolocation data (e.g., given geolocation "L1"), the entries may be deemed consistent and the geolocation data in log 212 for that IP address valid. In contrast, where a given IP-address (e.g., "IP_address_2") occurs in multiple entries 402 and many of those entries reference different and inconsistent geolocations (e.g., several distant geolocations "L2", "L3" and "L4"), the entries may be deemed inconsistent and the geolocation data in log 212 for that IP-address invalid. As explained above, this can occur when multiple devices at multiple disparate locations connect to a network through the same proxy server Various rules may be applied for determining the validity of IP-addresses and corresponding geolocation information stored in log 212. For example, a rule may require that the locations associated with a given percentage of entries 402 corresponding to a given IP-address within a given period of time must fall within a given geographic area (e.g., within a given zip-code or a given radius or the like).

Figure 6A:
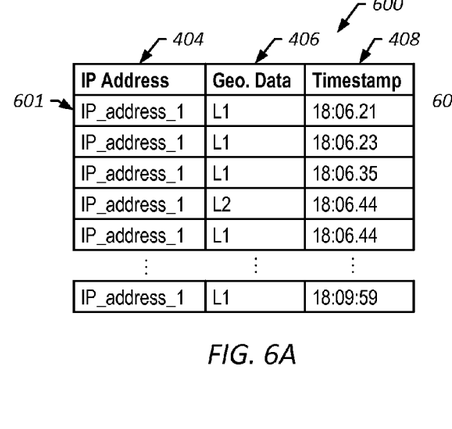
FIG. 6A depicts an exemplary extraction table including entries extracted from the IP-address/geolocation log of FIG. 4 in accordance with one or more embodiments of the present technique.

In some embodiments, the aforementioned rule may only be applied when at least a threshold number of entries 402 for the given IP address are found within the window of time used to assess the validity of the entries Method 500 may include, in response to identifying valid IP-address and corresponding geolocation data stored in log 212, and extracting the valid IP-address and corresponding geolocation data as depicted at blocks 504 and 506. FIG. 6A depicts an exemplary extraction table 600 including entries 601 extracted from log 212. Each of entries 601 may include data corresponding to data of entries 402 determined to be valid based on an assessment of log 212 for a given IP-address. In some embodiments an extraction table 600 may be generated, temporarily stored, processed, and deleted (or otherwise discarded) to increase user privacy by ensuring that highly-precise geolocation data associated with their IP-address is processed and disposed of quickly.

Method 500 may include reducing the valid geolocation data identified/extracted, as depicted at block 508. Reducing the valid geolocation data identified/extracted may include reducing the granularity of the geolocation data (e.g., from geographic coordinates to a zip-code).

Figure 6B:
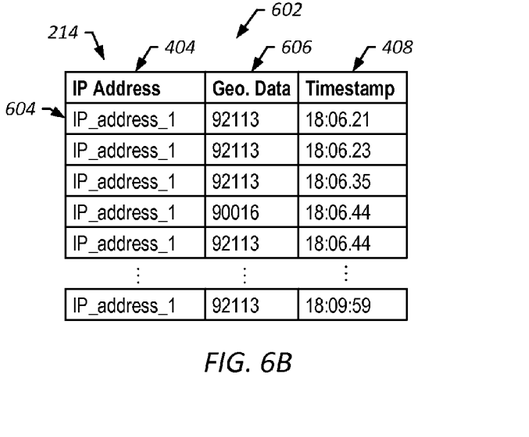
FIG. 6B depicts a reduced extraction table including exemplary listing of entries extracted from IP-address/geolocation log of FIG. 4 and having reduced geolocation data in accordance with one or more embodiments of the present technique.

FIG. 6B depicts a reduced extraction table 602 including exemplary listing of entries 604 extracted from log 212 and having reduced geolocation data (e.g., zip-codes) 606.

Figure 7:
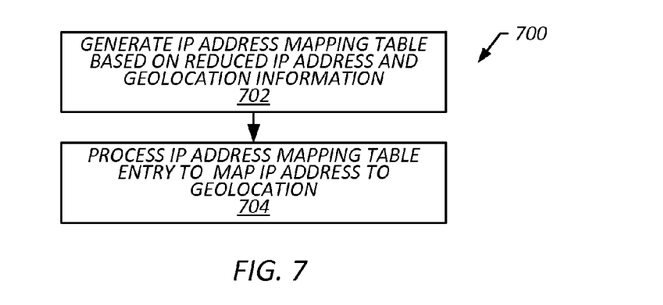
FIG. 7 is a flowchart that illustrates a method for mapping an IP-address to a given geolocation based on high-precision geolocation data in accordance with one or more embodiments of the present technique.

FIG. 7 is a flowchart that illustrates an exemplary method 700 for mapping an IP-address to a given geolocation. Method 700 may include generating an IP-address mapping table based on IP-address/reduced-geolocation information 214, as depicted at block 702. In some embodiments, generating an IP-address mapping table based on IP-address/reduced-geolocation information 214 may include consolidating geolocation data for each IP-address into a corresponding entry of an IP-address/geolocation mapping table 216.

Figure 8A:
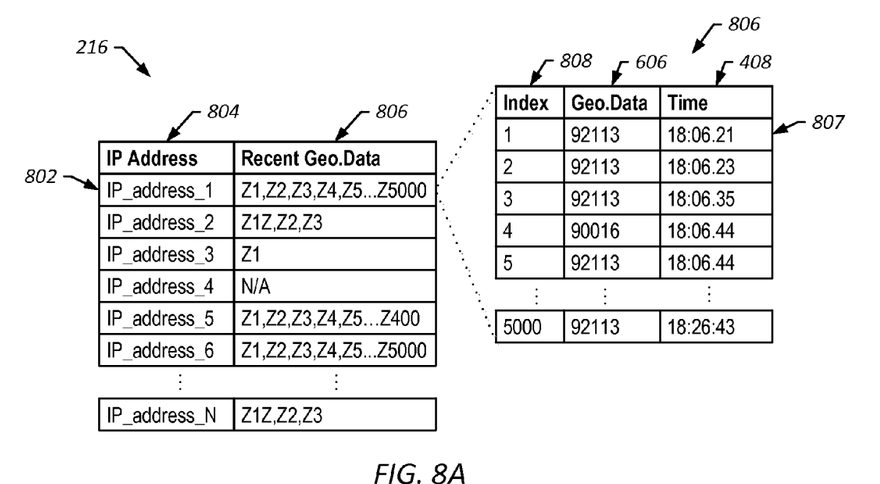
FIG. 8A depicts an exemplary embodiment of IP-address/geolocation mapping table in accordance with one or more embodiments of the present technique.

FIG. 8A depicts an exemplary embodiment of IP-address/geolocation mapping table 216. As depicted, IP-address/geolocation mapping table 216 may include a listing of entries 802 each corresponding to a given IP-address 804 and recent geolocation data 806 corresponding to the given IP-address 804. Recent geolocation data 806 may be generated by consolidating geolocation data (e.g., zip-codes and timestamps) extracted from IP-address/reduced-geolocation data 214 received by LES server 206 from pipe processor 204. For example, each dataset 807 (e.g., represented by a given identifier "ZN" where "N" corresponds to an index of the dataset) of recent geolocation data 806 may include an index 808, reduced geolocation data (e.g., zip-code) 606, and/or timestamp 408 (as depicted in detail in the listing to the right of table 216. A given index 808 may be indicative of an ordering of datasets 807 based on their corresponding timestamp 408. For example, the oldest dataset 807 associated with the oldest timestamps (e.g., "18:06.21") 408 may have the lowest index (e.g., "1") 808, with the newer datasets 807 associated with more recent timestamps (e.g., "18:06.23") 408 having incrementally higher indices (e.g., "2") 808.

Figure 8B:
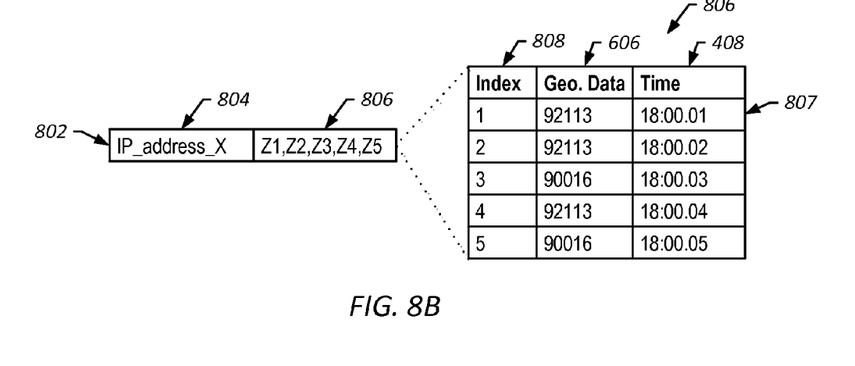
FIG. 8B depicts exemplary recent geolocation data including five datasets corresponding to a given IP-address in accordance with one or more embodiments of the present technique.

In some embodiments, recent geolocation data 806 for a given IP-address may be restricted to a given number of datasets 807, for example, the five-thousand most recent entries of IP-address/reduced-geolocation data 214 corresponding to the given IP-address Method 700 may include processing IP-address mapping table 216 to map a given IP-address to a given geolocation, as depicted at block 704. In some embodiments, processing IP-address/geolocation mapping table 216 may include processing recent geolocation data 806 for a given entry 802 to determine a geolocation (e.g., zip-code, city, county, state, county, continent, or the like) that corresponds to the given IP-address 804 of the given entry 802. FIG. 8B depicts exemplary recent geolocation data 806 including five datasets 807 corresponding to a given IP-address (e.g., "IP_address_X"). The exemplary set of recent geolocation data 806 of FIG. 8B may be referred to herein for the purposes of simplifying explanation of various processing techniques. It will be appreciated that similar processing techniques may be employed to other sets of geolocation data 806, such as the geolocation data 806 corresponding to "IP_address_1" including five-thousand datasets 807.

In some embodiments, processing recent geolocation data 806 for a given entry 802 to determine a geolocation that corresponds to the given IP-address 804 of the given entry 802, may include selecting a geolocation that occurs most frequently (i.e., the highest number or percentage of times) within the given recent geolocation data 806. For example, with regard to the exemplary recent geolocation data 806 of FIG. 8B, where the zip-code "92113" occurs in three of the five or 60% of the datasets 807 corresponding to "IP_address_X", the zip-code "92113" may be determined to correspond to "IP_address_X" and, thus, "IP_address_X" may be mapped to zip-code "92113".

Moreover, since the zip-code "92113" corresponds to the city of San Diego, the mapping of IP_address_X can likewise be mapped to the County of San Diego, the state of California, the United States and the continent of North America.

In some embodiments, processing recent geolocation data 806 for a given entry 802 to determine a geolocation that corresponds to the given IP-address 804 of the given entry 802 may include weighting the recent geolocation data 806. For example, each location associated with an IP-address 804 may be weighted by an amount based on timestamps 408 and/or the number of times the location appears in recent geolocation data 806. The IP-address may be mapped to the geolocation with the highest overall weighted count.

In some embodiments, weighting may be based on the age of the given dataset 807. For example, older datasets 807 may be weighted or counted less than newer datasets 807. In some embodiments, each dataset 807 may be assigned a decay weight based on the age of the dataset 807. For example, with regard to the exemplary recent geolocation data 806 of FIG. 8B, applying a decay with a half-life of five seconds to timestamps 408 for datasets 807 respectively results in weights of "0.57", "0.66", "0.76", "0.87" and "1" being associated with the data sets where the weighting is determined by the following Equation (1):

$$I = 2^{\left(\frac{-(t-t_0)}{t_{1/2}}\right)} \quad (1)$$

Where "I" is the weight of the location determined at the time "t", "$t_o$" is the current or reference time, and "$t_{1/2}$" is the half-life (e.g., five seconds). Using this method, the weighted count for zip code "92113" is 2.1 (e.g., 0.57+0.66+ 0.87), while the weighted count for zip-code "90016" is "1.76" (e.g., 0.76+1). Accordingly, "IP_address_X" may be mapped to zip-code "92113" since that zip code has the highest weighted count, even though the most recent data (e.g., corresponding to index 5) maps the IP address to zip 90016. The times and half-life provided herein are intended to be exemplary, of course, and alternative embodiments may include any suitable half-life (e.g., one minute, one hours, or the like). Moreover, different formulas for weighting the entries based on their timestamps may be used.

In some embodiments, a confidence value may be associated with the resulting mapping. The confidence score indicates the likelihood of receiving a given location from the recent geolocation data 806, and can be based on timestamps, counts or any other suitable measure of the likelihood for obtaining a given geolocation from the geolocation data 806. In some embodiments, an IP-address may be mapped to a given geolocation obtained from IP-address/ geolocation data 210 only if a corresponding confidence level for that geolocation exceeds a given threshold value.

In some embodiments, an IP-address may be mapped to one or more geolocations using different IP-address/geolocation mapping techniques. In some embodiments, an IP address can be mapped to a given geolocation only when the different IP-address/geolocation mapping techniques map the IP-address to the same location or a consistent location. For example, where "IP_address_X" is mapped to the United States and the State of California based on IP-address/geolocation map 220, and where "IP_address_X" is mapped to the zip-code "92113" located in San Diego, Calif., based on processing of IP-address/geolocation mapping table 216, the two mappings may be considered consistent, and "IP_address_X" may be mapped to the zip-code "92113" based on the more precise IP-address/geolocation map 216.

In some embodiments, an IP-address may be mapped to a location based on mapping table 216 that disagrees or otherwise conflicts with a location obtained by mapping the IP-address using another mapping technique if the confidence value for the location returned from the other mapping technique is low and/or the confidence level for the location returned by the mapping table 216 is high.

Figure 9:
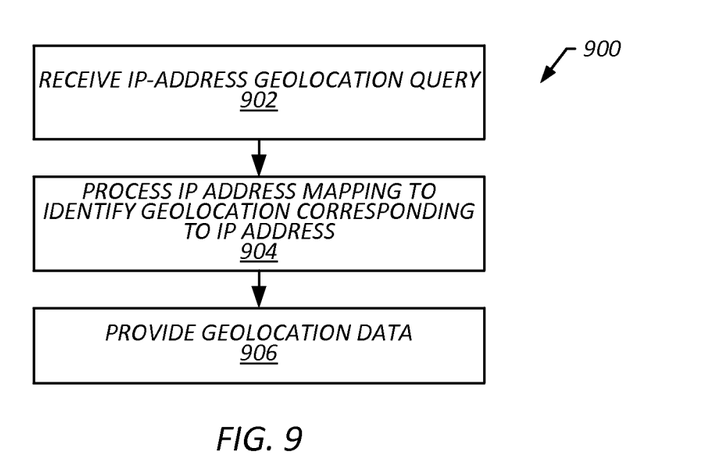
FIG. 9 is a flowchart that illustrates a method of providing geolocation data in accordance with one or more embodiments of the present technique.

FIG. 9 is a flowchart that illustrates a method 900 of providing geolocation data in accordance with one or more embodiments of the present technique. Method 900 may include receiving an IP-address geolocation query, as depicted at block 902. In some embodiments, receiving an IP-address geolocation query may include LES server 206 receiving IP-address geolocation query 218. For example, where a user transmits to content provider 104 a request for a webpage from an access device 106e and the request is associated with a given IP-address, content provider 104 may submit to LES server 206 a corresponding IP-address geolocation query 218 specifying the given IP-address and requesting geolocation information corresponding to the given IP-address.

Method 900 may include mapping the given IP-address to identify a geolocation, as depicted at block 904. In some embodiments, mapping the given IP-address to a geolocation may include processing an IP-address/geolocation mapping table 216 and/or other IP-address geolocation maps (e.g., IP-address/geolocation map 220) as described above. For example, LES server 206 may identify the given IP-address "132.16.254.1" as being mapped to zip-code "92113" based at least in part on processing of IP-address/ geolocation mapping table 216.

Method 900 may include returning the geolocation corresponding to the given IP-address, as depicted at block 906. In some embodiments, the geolocation data provided may also include an associated confidence level. In some embodiments, content provider 104 may use the confidence value to assess how or even if the geolocation should be relied on. For example, if the confidence value is low (e.g., below 50%) the content provider may serve content corresponding to the city level as opposed to the zip-code level, or may not provide any geo-specific content.

Methods 300, 500, 700 and/or 900 are exemplary embodiments of methods employed in accordance with techniques described herein. Methods 300, 500, 700 and/or 900 may be modified to facilitate variations of its implementations and uses. Methods 300, 500, 700 and/or 900 may be implemented in software, hardware, or a combination thereof. Some or all of methods 300, 500, 700 and 900 may be implemented by log module 250, extraction module 252, and/or map module 254. The order of methods 300, 500, 700 and/or 900 may be changed, and various elements may be added, reordered, combined, omitted, modified, etc. For example, a log of recently acquired IP-address and corresponding geolocation data may be periodically monitored. Data that is too old may be discarded. Data that is deemed unreliable (e.g., data that associates many distant locations to the same IP-address) may be discarded. The remaining data may be processed to determine an IP-address to geolocation mapping, where each IP-address is mapped to a single location. The location can be, for example, an average location or a most probable location determined from the locations associated with the IP-address in the log data. The IP-address to geolocation map may be used to return a location corresponding to a given IP-address. The IP-address to geolocation map may be revised periodically (e.g., once per hour) to ensure the data is up-to-date.

As explained above, the described method uses precise-geolocation data received from a first device (e.g., access device 106a) on a network (e.g., network 108) in association with an IP-address to geolocate other network devices (e.g., access devices 106b-106e) associated with the same IP-address.

Exemplary Computer System

Figure 10:
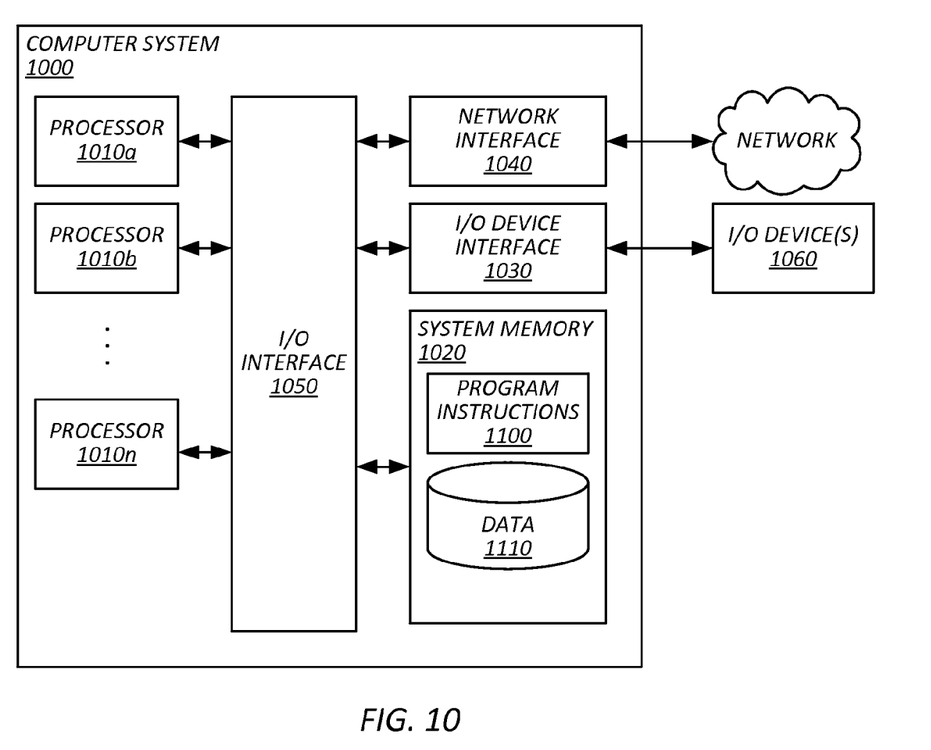
FIG. 10 is a diagram that illustrates an exemplary computer system in accordance with one or more embodiments of the present technique.

FIG. 10 is a diagram that illustrates an exemplary computer system 1000 in accordance with one or more embodiments of the present technique. Various portions of systems and methods described herein, may include or be executed on one or more computer systems similar to system 1000. For example, access devices 106, content provider 104, and/or geolocation system 102 (e.g., LBS server 202, pipe processor 204, and/or LES server 206) may employ a computer processing system similar to at least a portion of computer system 1000. Further, methods/processes/modules described herein may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1040. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed:

1. A computer-implemented method for receiving targeted content at location unaware access devices, the method comprising:
   transmitting a first communication, by a location aware access device via a network device having an IP address, wherein the location aware access device is connected to the network device according to a local area network (LAN) IP address of the location aware access device and wherein the first communication includes the IP address of the network device and a geographic location of the location aware access device;
   transmitting a second communication, by a location unaware access device via the network device, wherein the location unaware access device is connected to the network device according to a LAN IP address of the location unaware access device and wherein the second communication includes the same IP address of the network device; and
   receiving, at the location unaware access device from a content provider, content targeted for a geographic area selected based on the geographic location transmitted by the location aware access device.

2. The method of claim 1, wherein the IP address is a first IP address in a first instance, and the network device acquires a second IP address different from the first IP address in a second instance; the method further comprising:
   transmitting a third communication, by the location aware access device via the network device, wherein the third communication includes (i) the second IP address and (ii) an updated geographic location of the location aware access device;
   transmitting a fourth communication, by the location unaware access device via the network device, wherein the fourth communication includes the second IP address; and
   receiving, at the location unaware access device via the network device, updated content targeted for a geographic area selected based on the updated geographic location.

3. The method of claim 1, further comprising:
   transmitting a plurality of communications from a plurality of location aware access devices via the network device, each of the plurality of communications indicating a respective geographic location of the location aware access device;
   wherein the content targeted for the geographic area is selected further based on the geographic locations of the plurality of location aware access devices.

4. The method of claim 3, wherein the content targeted for the geographic area is selected based on a most frequently occurring geographic location of the geographic locations transmitted by the plurality of location aware access devices.

5. The method of claim 3, wherein the content targeted for the geographic area is selected based on a time in which each of the geographic locations is transmitted by the plurality of location aware access devices.

6. The method of claim 3, wherein the content targeted for the geographic area is selected further based on the geographic locations of the plurality of location aware access devices when each of the geographic locations is within the geographic area.

7. The method of claim 1, wherein the content targeted for the geographic location is received at the location unaware access device only when the first communication and the second communication are transmitted within a certain time relative to each other.

8. A system for receiving targeted content at location unaware access devices, the system comprising:
   a location aware access device including:
      one or more first processors; and
      a first non-transitory memory coupled to the one or more first processors and storing thereon first instructions that, when executed by the one or more first processors, cause the location aware access device to:
         transmit a first communication via a network device having an IP address, wherein the location aware access device is connected to the network device according to a local area network (LAN) IP address of the location aware access device and wherein the first communication includes the IP address of the network device and a geographic location of the location aware access device; and
   a location unaware access device including:
      one or more second processors; and
      a second non-transitory memory coupled to the one or more second processors and storing thereon second instructions that, when executed by the one or more second processors, cause the location unaware access device to:
         transmit a second communication via the network device, wherein the location unaware access device is connected to the network device according to a LAN IP address of the location unaware access device and wherein the second communication includes the same IP address of the network device, and
         receive, from a content provider, content targeted for a geographic area selected based on the geographic location transmitted by the location aware access device.

9. The system of claim 8, wherein the IP address is a first IP address in a first instance, and the network device acquires a second IP address different from the first IP address in a second instance; the first instructions stored in the first non-transitory memory further cause the location aware access device to transmit a third communication via the network device, wherein the third communication includes (i) the second IP address and (ii) an updated geographic location of the location aware access device; and
   wherein the second instructions stored in the second non-transitory memory further cause the location unaware access device to:
      transmit a fourth communication via the network device, wherein the fourth communication includes the second IP address, and
      receive via the network device, updated content targeted for a geographic area selected based on the updated geographic location.

10. The system of claim 8, further comprising a plurality of location aware access devices, each of the plurality of location aware access devices comprising:
   one or more first processors, and
   a first non-transitory memory storing thereon first instructions that, when executed by the one or more first processors, cause the respective location aware access device to transmit a first communication via the network device, each of the plurality of first communications indicating a respective geographic location of the location aware access device;

wherein the content targeted for the geographic area is selected further based on the geographic locations of the plurality of location aware access devices.

11. The system of claim 10, wherein the content targeted for the geographic area is selected based on a most frequently occurring geographic location of the geographic locations transmitted by the plurality of location aware access devices.

12. The system of claim 10, wherein the content targeted for the geographic area is selected based on a time in which each of the geographic locations is transmitted by the plurality of location aware access devices.

13. The system of claim 10, wherein the content targeted for the geographic area is selected further based on the geographic locations of the plurality of location aware access devices when each of the geographic locations is within the geographic area.

14. The system of claim 8, wherein the content targeted for the geographic location is received at the location unaware access device only when the first communication and the second communication are transmitted within a certain time relative to each other.

15. A computer-implemented method for determining the location of location unaware access devices, the method comprising:

receiving, at one or more processors, a first communication from a location aware access device via a network device having an IP address, wherein the location aware access device is connected to the network device according to a local area network (LAN) IP address of the location aware access device and wherein the first communication includes the IP address of the network device and a geographic location of the location aware access device;

receiving, at one or more processors, a second communication from a location unaware access device via the network device, wherein the location unaware access device is connected to the network device according to a LAN IP address of the location unaware access device and wherein the second communication includes the same IP address of the network device;

determining, by the one or more processors, a geographic area of the location unaware access device based on the geographic location received from the location aware access device; and transmitting, by the one or more processors, the determined geographic area of the location unaware access device to a content provider which provides content targeted for the geographic area to the location unaware access device.

16. The method of claim 15, further comprising receiving a plurality of first communications from a plurality of location aware access devices via the network device, each of the plurality of first communications indicating a respective geographic location of the location aware access device;

wherein the geographic area of the location unaware access device is determined further based on the geographic locations of the plurality of location aware access devices.

17. The method of claim 16, wherein the geographic area of the location unaware access device is determined based on a most frequently occurring geographic location of the geographic locations received from the plurality of location aware access devices.

18. The method of claim 16, wherein the geographic area of the location unaware access device is determined based on a time in which each of the geographic locations is received from the plurality of location aware access devices.

19. The method of claim 15, wherein the IP address is a first IP address in a first instance, and the network device acquires a second IP address different from the first IP address in a second instance; the method further comprising:

receiving, at the one or more processors, a third communication from the location aware access device via the network device, wherein the third communication includes (i) the second IP address and (ii) an updated geographic location of the location aware access device;

receiving, at the one or more processors, a fourth communication from the location unaware access device via the network device, wherein the fourth communication includes the second IP address;

determining, by the one or more processors, an updated geographic area of the location unaware access device based on the updated geographic location received from the location aware access device; and transmitting, by the one or more processors, the updated geographic area of the location unaware access device to the content provider.

20. The method of claim 15, wherein the geographic area is determined based on the geographic location received from the location aware access device only when the first communication and the second communication are received within a certain time relative to each other.

* * * * *